United States Patent [19]

Slikker

[11] Patent Number: 4,811,833
[45] Date of Patent: Mar. 14, 1989

[54] WIPER APPARATUS FOR CONVEYOR BELT
[75] Inventor: Dick Slikker, Ede, Netherlands
[73] Assignee: HCC-EDE B.V., Ede, Netherlands
[21] Appl. No.: 60,853
[22] Filed: Jun. 12, 1987
[30] Foreign Application Priority Data Dec. 5, 1986 [NL] Netherlands .................. 8603104

[51] Int. Cl.$^4$ ............................................. B65G 45/00
[52] U.S. Cl. ................................... 198/499; 198/497;
15/256.5
[58] Field of Search .............................. 198/497–499;
15/256.5, 256.51

[56] References Cited
U.S. PATENT DOCUMENTS 3,414,116 12/1968 Oury ................................. 198/497
3,722,667 3/1973 Olson ............................... 198/499
4,131,194 12/1978 Andersson ....................... 198/497

FOREIGN PATENT DOCUMENTS 2365415 12/1974 Fed. Rep. of Germany .
0131250 6/1978 Fed. Rep. of Germany ...... 198/497
0234847 4/1986 Fed. Rep. of Germany ...... 198/497
0882883 11/1981 U.S.S.R. ............................ 198/497
0299329 2/1929 United Kingdom .............. 198/497

OTHER PUBLICATIONS

European Search Report, No. 8,603,104.

Primary Examiner—Robert J. Spar
Assistant Examiner—Lyle Kimms
Attorney, Agent, or Firm—Cushman, Darby & Cushman

[57] ABSTRACT

A conveyor belt comprising an endless belt of a flexible material, and having an upper carrying run and a lower run (1) in which at least one stripper device is provided. The stripper device comprises a frame (2) including a plurality of stripper bars which are mounted on the frame. The stripper bars bear their free edges against the upper face of a run of the conveyor belt, and are formed by a V-shaped bar (4) with relatively short legs (4', 4"). The V-shaped bar has its tip upstream in relation to the direction of movement of the belt. The stripper device also includes a plurality of elongate bars (5, 6) which substantially form extensions of the legs of the V-shaped bar (4). These bars (5, 6) are placed further inwards in relation to the respective legs (4', 4") of the V-shaped bar (4) in such a manner that neighbouring ends of the legs of the V-shaped bar and of the elongate bars overlap.

2 Claims, 1 Drawing Sheet

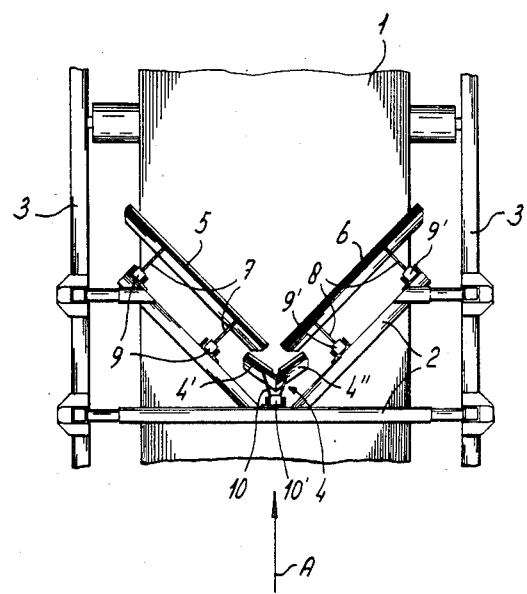

WIPER APPARATUS FOR CONVEYOR BELT

The invention relates to a conveyor belt comprising an endless belt of a flexible material, which is guided around at least two guide rollers disposed at a distance from one another, one of these guide rollers being disposed at the feed end and the other at the discharge end of the conveyor belt, and one of these rollers being adapted to be driven rotationally so that the belt comprises an upper carrying run moving in a determined direction and a lower run moving substantially parallel thereto but in the opposite direction. A conveyor belt of this kind is widely known.

Conveyor belts of this type are used mainly for conveying granular material, which is loaded at the feed end of the conveyor belt, on the upper run of the latter, and at the other or discharge end is discharged from the upper run of the belt. During the carrying of this material on the upper run of the belt, material may fall down over the edges of the belt and arrive on the upper face of the lower run of the belt. This means that material is then jammed between the belt and the guide roller at the feed end of the conveyor belt, which is very detrimental to the conveyor belt.

The invention seeks to provide a conveyor belt with which this fault cannot occur.

This aim is achieved in that in the conveyor belt according to the invention at least one stripper device is provided which comprises a frame and a plurality of stripper bars which are mounted on said frame, bear by their free edges against the upper face of a run of the conveyor belt, and which are formed by a V-shaped bar with relatively short legs and with its tip upstream in relation to the direction of movement of said run of the belt, and by a plurality of elongate bars which substantially form extentions of the legs of the V-shaped bar, while however these bars are in each case placed further inwards in relation to the respective legs of the V-shaped bar and in relation to preceding elongate bars, in such a manner that neighbouring ends of the legs of the V-shaped bar and of the elongate bars overlap.

Because of the presence of the stripper device, when it is disposed between the upper and lower runs of the belt near the feed end of the conveyor belt so that the bars bear against the top face of the lower run of the belt, material which during the operation of the conveyor belt has fallen off the upper run of the belt and passed over the edges of the belt onto the lower run is pushed away towards both edges of said lower run of the belt and over the edges of the latter, so that material can never be jammed between the belt and the guide roller at the feed end of the conveyor belt.

The stripper device can also advantageously be used for removing material carried by the upper run of the belt laterally from said run, in which case the stripper device is placed above the upper run, so that the stripper bars bear against the top face of said upper run.

Since the stripper bars are generally disposed in the shape of a V, a ploughing action is achieved which is helpful in pushing material away from the lower run of the belt. It is true that in an arrangement of this kind the tip of this V-shape is usually subject to wear, but since this tip is composed of a separate V-shaped stripper bar, the tip of the V-shaped arrangement can easily be replaced.

The V-shaped bar and the elongate bars are preferably each fastened to the frame with the interposition of one or more elements acting as torsion springs, so that the stripper bars bear resiliently against the respective run of the belt.

In this way the stripper bars can always adapt themselves to the path which is followed by said run and which often changes and differs from a completely flat surface, so that the stripper bars bear effectively against said run of the conveyor belt over their entire length.

The invention is explained more fully below with reference to the drawing, which shows in top plan view a part of the lower side of a conveyor belt and a stripper device.

The lower conveyor belt run 1 partly shown in the drawing is moved in the direction of the arrow A. A V-shaped arrangement of stripper bars is mounted on a frame 2 in such a manner that these stripper bars bear by their free ends against the run 1 of the belt. The frame 2 is fastened to the frame 3 of the conveyor belt.

The stripper bars are formed by a V-shaped stripper bar 4 having two relatively short legs 4' and 4", and by two elongate stripper bars 5 and 6, which substantially form respectively extensions of the legs 4' and 4" of the V-shaped stripper bar 4, but are offset inwards in relation to said legs 4' and 4", the inner ends of the bars 5 and 6 overlapping the outer ends of the legs 4' and 4".

The elongate stripper bars 5 and 6 may optionally each be divided into two or more separate stripper bars which are offset relative to one another in the same manner as is illustrated for the legs 4', 4" and the bars 5, 6.

The stripper bars 5 and 6 are joined to the carrier frame 2 by means of the arms 7 and 8 respectively, these arms 7 and 8 being swivellably mounted on the frame 2 with the interposition of torsion springs 9 and 9' respectively. The V-shaped stripper bar 4 is also mounted swivellably on the frame 2 by means of an arm construction 10 and a torsion spring 10'.

I claim:

1. In a conveyor belt system comprising an endless belt guided around at least two guide rollers being disposed at a distance from one another, one of said guide rollers being disposed at the feed end and the other of said rollers at the discharge end of the conveyor belt, and one of said rollers being adapted to be driven rotationally so that said endless belt includes an upper carrying run moving in a determined direction and a lower run moving substantially parallel thereto but in an opposite direction, said system including a conveyor belt stripper comprising:

at least one stripper device having a frame and a plurality of stripper elements, each element having an upstream edge relative to said determined direction of movement and a downstream free edge, said elements being mounted to said frame so that said stripper elements bear their free edges against an upper face non-material carrying run of said conveyor belt, said stripper elements forming a V-shaped stripper element with relatively short legs positioned with its tip upstream in relation to the direction of movement of said run of the belt, said stripper device further including a plurality of elongate stripper elements mounted to said frame so as to define extensions of said legs of said V-shaped stripper element and are in each case placed further inward and downstream in relation to the respective leg of said V-shaped element and in relation to preceding elongate stripper elements positioned along said conveyor so that neighboring ends of said legs of the V-shaped element and of said the elongate elements overlap.

2. A stripper device according to claim 1, wherein: said V-shaped element and said elongate elements are each fastened so as to swivel with respect to said frame and include the interposition of one or more spring elements acting so that said stripper elements bear resiliently against said run of said belt.

* * * * *